United States Patent
Boelter et al.

(10) Patent No.: US 9,626,270 B2
(45) Date of Patent: Apr. 18, 2017

(54) LINK RETRAINING BASED ON RUNTIME PERFORMANCE CHARACTERISTICS

(71) Applicant: Intel Corporation, Santa Clara, CA (US)

(72) Inventors: Joshua Boelter, Portland, OR (US); Duane M. Heller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 14/497,499

(22) Filed: Sep. 26, 2014

(65) Prior Publication Data

US 2016/0092335 A1  Mar. 31, 2016

(51) Int. Cl.
| | |
|---|---|
| *G06F 11/30* | (2006.01) |
| *G06F 13/00* | (2006.01) |
| *G06F 1/32* | (2006.01) |
| *G06F 11/34* | (2006.01) |

(52) U.S. Cl.
CPC ............ *G06F 11/3051* (2013.01); *G06F 1/32* (2013.01); *G06F 11/3027* (2013.01); *G06F 11/349* (2013.01); *G06F 13/00* (2013.01); *G06F 11/3058* (2013.01); *G06F 11/3409* (2013.01); *Y02B 60/165* (2013.01)

(58) Field of Classification Search
CPC ..................................................... G06F 3/0644
See application file for complete search history.

(56) References Cited

U.S. PATENT DOCUMENTS

| | | | |
|---|---|---|---|
| 5,859,959 A * | 1/1999 | Kimball | G06F 11/2007 370/216 |
| 7,426,597 B1 | 9/2008 | Tsu et al. | |
| 7,539,809 B2 * | 5/2009 | Juenger | G06F 13/40 370/465 |
| 8,320,411 B1 * | 11/2012 | Sedarat | H04W 52/365 370/241 |
| 8,782,461 B2 * | 7/2014 | Muthrasanallur | G06F 11/0793 714/4.1 |
| 2004/0088406 A1 | 5/2004 | Corley et al. | |
| 2006/0291500 A1 * | 12/2006 | Kroninger | H04L 12/2856 370/465 |
| 2007/0067548 A1 | 3/2007 | Juenger | |
| 2007/0226579 A1 * | 9/2007 | Alexander | G06F 11/106 714/758 |
| 2008/0034148 A1 | 2/2008 | Gower et al. | |

(Continued)

FOREIGN PATENT DOCUMENTS

EP  2778938 A2  9/2014

OTHER PUBLICATIONS

International Search Report and Written Opinion received for PCT application No. PCT/US2015/046686, mailed on Dec. 31, 2015. 10 pages.

*Primary Examiner* — Nadeem Iqbal
(74) *Attorney, Agent, or Firm* — Jordan IP Law, LLC

(57) ABSTRACT

Systems and methods may provide for monitoring one or more runtime performance characteristics of a link and determining a state of the link based on at least one of the one or more runtime performance characteristics. Additionally, a retraining of the link may be automatically scheduled based on the state of the link. In one example, scheduling the retraining of the link further includes setting one or more retraining parameters.

24 Claims, 4 Drawing Sheets

(56) References Cited

U.S. PATENT DOCUMENTS

| | | | | |
|---|---|---|---|---|
| 2011/0047400 A1* | 2/2011 | Blackmon | ............ | G06F 11/141 |
| | | | | 713/400 |
| 2016/0020952 A1* | 1/2016 | Berke | .................... | H04L 12/40 |
| | | | | 370/252 |

* cited by examiner

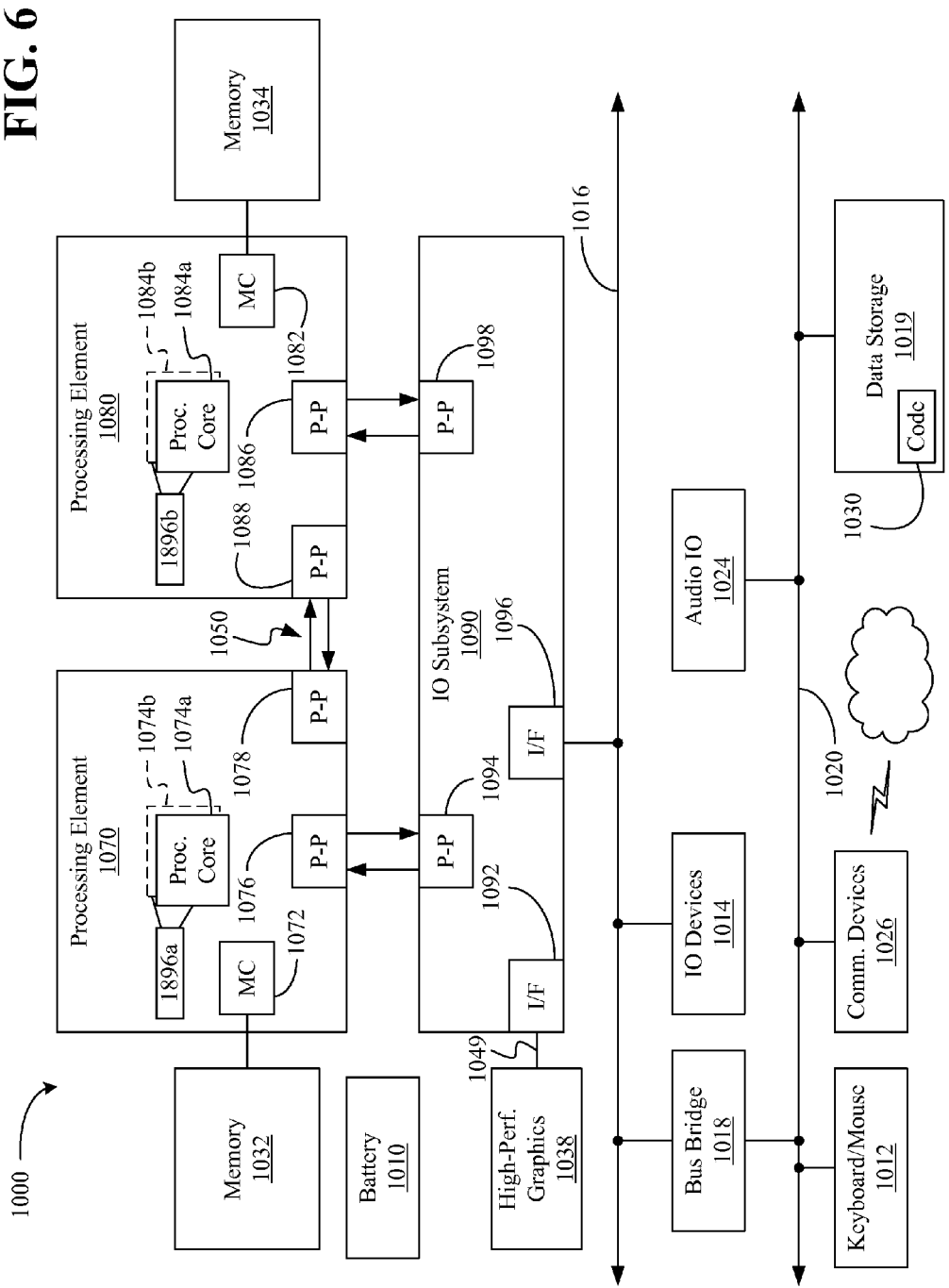

LINK RETRAINING BASED ON RUNTIME PERFORMANCE CHARACTERISTICS

TECHNICAL FIELD

Embodiments generally relate to link management. More particularly, embodiments relate to link retraining based on runtime performance characteristics.

BACKGROUND

Communication busses may be used to transfer information between components of computing systems in a wide variety of settings. Bus training may involve configuring transmitters, receivers and other bus components to have the appropriate voltage and/or timing settings so that data is properly detected and interpreted at the receiving end of the bus. Typically, a bus may be trained only once in a manufacturing environment (e.g., the factory) prior to shipment of the computing system to the retailer and/or end user. The operating environment of the bus, however, may differ significantly from the manufacturing environment in terms of thermal conditions, power consumption, and so forth, particularly as components deteriorate over time. This mismatch between the training conditions of the manufacturing environment and the runtime conditions of the operating environment may therefore result in conventional busses operating under suboptimal configurations.

BRIEF DESCRIPTION OF THE DRAWINGS

The various advantages of the embodiments will become apparent to one skilled in the art by reading the following specification and appended claims, and by referencing the following drawings, in which:

FIG. 6 is a block diagram of an example of a computing system according to an embodiment.

DESCRIPTION OF EMBODIMENTS

Figure 1:
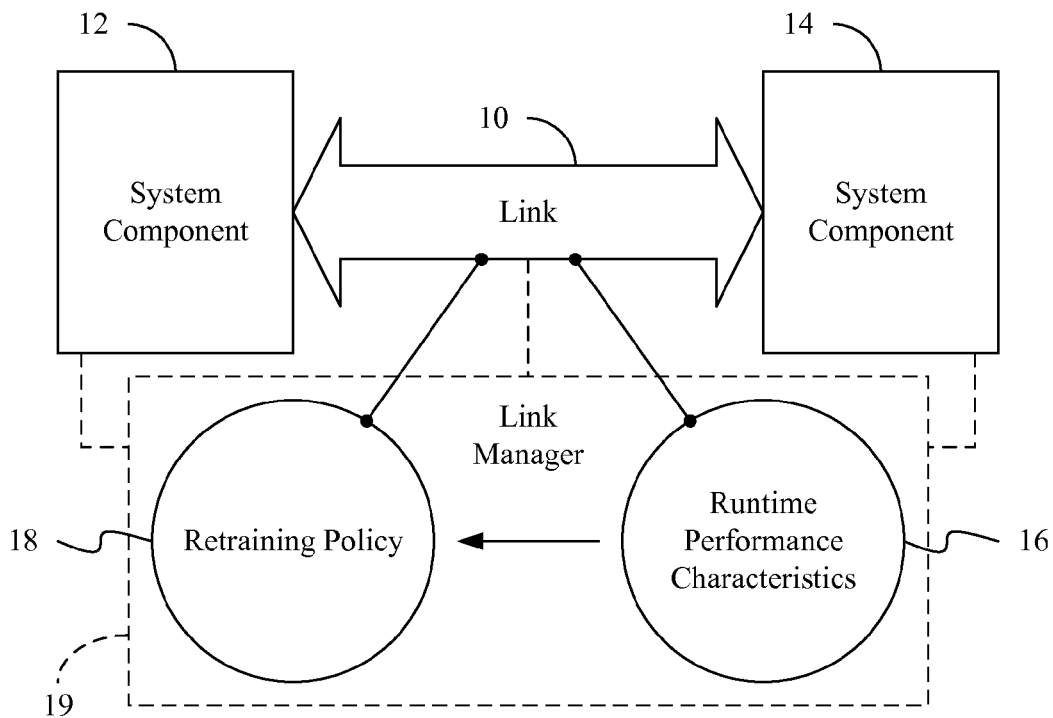
FIG. 1 is a block diagram of a retraining approach according to an embodiment.

Turning now to FIG. 1, a retraining approach is shown in which a link 10 enables the transfer of information between a first system component 12 and a second system component 14. The link 10, which may be physically attached to the system components 12, 14 or part of discrete/remote subsystems that the system components 12, 14 may logically reach/program, may include, for example, a memory bus, a processor-to-processor bus, an input/output (IO) bus (e.g., serial, parallel), and so forth. For example, the link 10 might support communication between the system components 12, 14 via a PCI-e (Peripheral Components Interconnect Express, e.g., PCI Express x16 Graphics 150W-ATX Specification 1.0, PCI Special Interest Group), MIPI (Mobile Industry Processor Interface) or other suitable protocol. Accordingly, the system components 12, 14 may include, for example, processors (e.g., graphics, host and/or central processing unit/CPU), chipsets, IO modules, memory devices and/or controllers, network controllers and/or other subsystems.

In the illustrated example, a link manager 19 monitors one or more runtime performance characteristics 16 such as, for example, error status (e.g., correctable, uncorrectable), bandwidth status, retransmission status (e.g., packet loss), power consumption status and/or thermal status information for the link 10 in real-time and uses the characteristics 16 to determine a retraining policy 18 for the link 10. Thus, rather than training the link 10 only once in the manufacturing environment, the illustrated approach enables the link 10 to be selectively retrained throughout the life of the link 10. Such an approach may enable the link 10 to automatically adapt to component degradation and other operational considerations over time in order to maintain an optimal performance profile.

Figure 2:
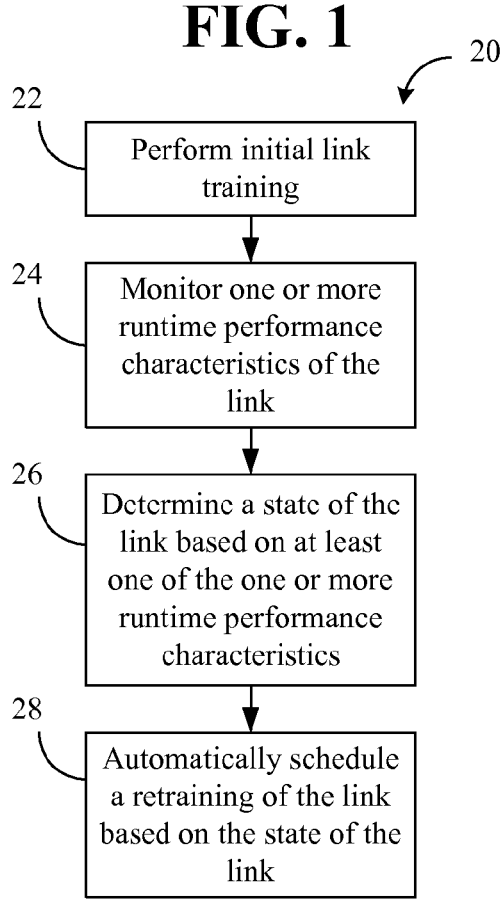
FIG. 2 is a flowchart of an example of a method of managing a link according to an embodiment.

Turning now to FIG. 2, a method 20 of managing a link is shown. The method 20 may be implemented as a module or related component in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 20 may be written in any combination of one or more programming languages, including an object oriented programming language such as Java, Smalltalk, C++, ACPI source language (ASL) or the like and conventional procedural programming languages, such as the "C" programming language or similar programming languages.

Illustrated processing block 22 performs an initial link training. The initial link training may take place upon an initial boot sequence of a system containing the link and may involve, for example, iteratively wave shaping, equalizing and/or establishing operational margins for the link with regard to voltage, timing, and so forth. Thus, transmitters associated with the link might be configured at block 22 with the appropriate parameters to drive digital voltages to certain levels and at certain moments in time in order to produce detectable voltage transitions and minimize error at the receiver. Of particular note, however, is that because the initial link training may take place outside the actual operating environment, the initial training parameters may be suboptimal due to changes in thermal conditions, degradation, humidity, noise sources, mechanical shock, etc., as well as inaccurate initial training. Indeed, these changes may even be seasonal or location dependent (e.g., a student moves a notebook computer from school back to home; a server in a high density environment is trained on a cold day during a cold boot but operates on a hot day, and so forth).

Accordingly, illustrated block 24 provides for monitoring one or more runtime performance characteristics of the link. As already noted, the runtime performance characteristics may include, for example, error status (e.g., correctable, uncorrectable), bandwidth status, retransmission status (e.g., packet loss), signal versus margin status, power consumption status and/or thermal status information for the link and/or system. The monitoring may therefore involve automatically accessing error status registers, link status registers, etc., as well as detecting various runtime events and/or interrupts. A state of the link may be determined at block 26 based on at least one of the one or more runtime performance characteristics. Thus, block 26 might involve quantifying and/or categorizing the number of uncorrectable errors, the link bandwidth, packet losses, the amount of power consumed by a link component, the operating temperature of a link component, and so forth. Illustrated block 28 automatically schedules a retraining of the link based on the state of the link. As will be discussed in greater detail, block 28 may use the link state to set retraining parameters to optimize, for example, operational margins, power consumption, etc., depending on the circumstances. Moreover, the retraining parameters may be tailored to address the specific runtime performance characteristics that are associated with state changes of the link. In one example, hardware monitors the runtime performance characteristics and sets a "degradation flag" for system software to consume/interpret/trigger retraining. Other distributions of the functions of the method 20 between hardware and software may also be used, depending on the circumstances.

Figure 3:
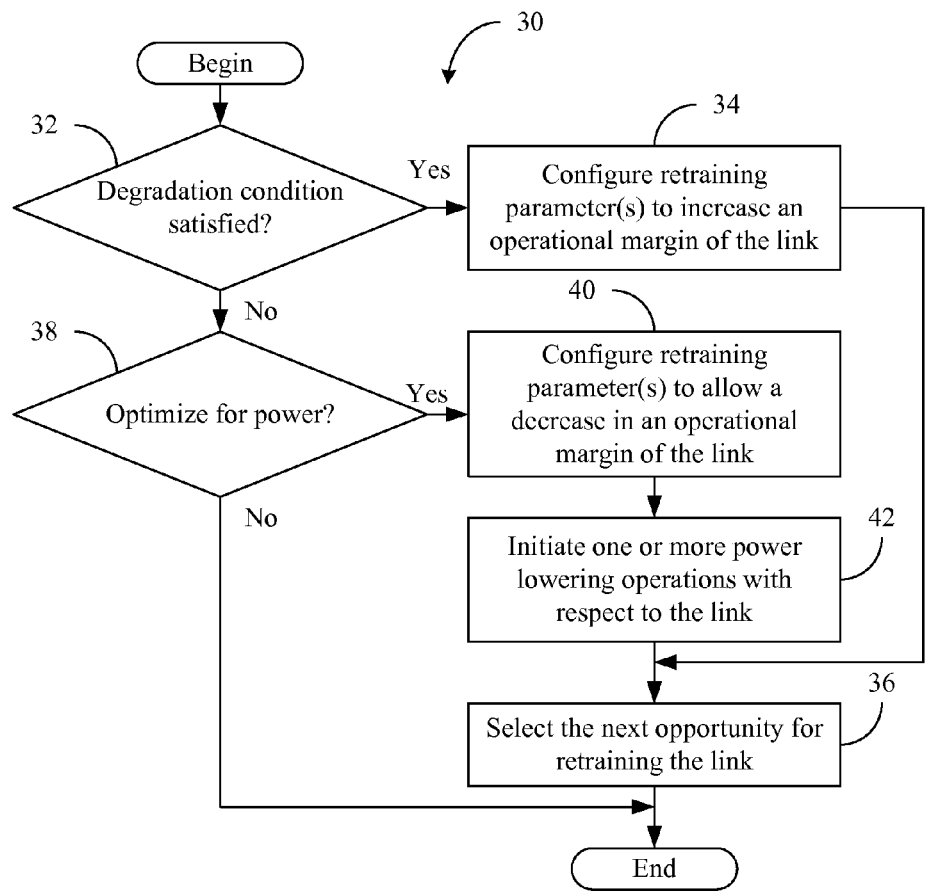
FIG. 3 is a flowchart of an example of a method of automatically scheduling the retraining of a link according to an embodiment.

FIG. 3 shows a method 30 of automatically scheduling the retraining of a link. The method 30 may be readily substituted for block 28 (FIG. 2), already discussed. The method 30 may also be implemented as a module or related component in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated block 32 determines whether the state of the link satisfies a degradation condition. Thus, block 32 may involve determining whether the number or rate of errors (e.g., correctable, uncorrectable) has reached a particular threshold, whether the link bandwidth has fallen below a particular threshold, whether packet losses have increased significantly, whether a link component is consuming an abnormally high amount of power (e.g., a peripheral card nearing life end), whether a link component is overheating, and so forth. If a degradation condition is satisfied, illustrated block 34 provides for configuring one or more retraining parameters to increase an operational margin of the link, wherein increasing the operational margin may result in greater immunity to noise.

The operational margin may be a voltage margin, timing margin, and so forth, that defines a wave shape for signals transmitted on the link. For example, if the expected voltage for "low" is 0V-0.4V and "high" is 4.6V-5V and the initial training of the link established a voltage margin of 0.1V (i.e., the receiver observes signals at 0.3V and 4.7V), block 34 might include increasing the voltage margin to 0.2V (i.e., the receiver observes signals at 0.2V and 4.8V), which may effectively tighten the constraints placed on the transmitter, reduce the likelihood of link transmission errors, increase noise immunity, and improve reliability. In another example, if the initial training of the link established a timing margin of 100 ns, block 34 may include increasing the timing margin to 200 ns, which may also tighten the constraints placed on the transmitter, reduce the likelihood of link transmission errors, increase jitter immunity, and improve reliability. The values provided herein are to facilitate discussion only and may vary depending on the circumstances. Moreover, other types of retraining parameters and/or operational margins may be used. Once the retraining parameters have been configured, illustrated block 36 selects the next opportunity for retraining the link (e.g., the next boot sequence, nearly instantaneous without system reset, etc.) and schedules the link to be retrained at the selected moment.

If it is determined at block 32 that the state of the link does not satisfy a degradation condition, illustrated block 38 determines whether the link may be optimized for power. In this regard, the link operating properly may present an opportunity to relax operational margins and reduce power consumption. Thus, block 38 might involve determining whether no link degradation has been detected for a certain amount of time. If so, illustrated block 40 configures one or more retraining parameters to allow and/or trigger a decrease in an operational margin of the link. For example, if the initial training of the link established a voltage margin of 0.2V, block 40 may include decreasing the voltage margin to 0.1V, which may effectively relax the constraints placed on the transmitter and enable lower power operation.

Accordingly, illustrated block 42 initiates one or more power lowering operations with respect to the link, wherein the decreased operational margin(s) may facilitate and/or enable the power lowering operations to be made. Block 42 may include, for example, powering down and/or bypassing link components such as amplifiers, control loops, and so forth. Moreover, the power lowering operations may take place during training/equalization (e.g., setting retraining parameters to meet a lower power goal established at runtime), as well as during runtime operations. Additionally, any power lowering operations initiated at block 42 may be reversed/canceled at block 34 if deterioration of the link is subsequently detected. As already noted, block 36 may provide for selecting the next opportunity for retraining the link and scheduling the link to be retrained at the selected opportunity.

Figure 4:
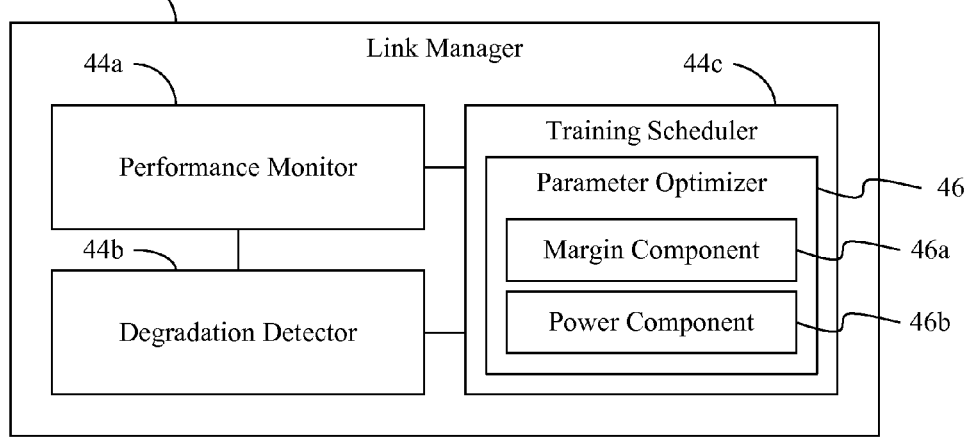
FIG. 4 is a block diagram of an example of a link manager according to an embodiment.

FIG. 4 shows a link manager 44 (44a-44c). The link manager 44 may be an apparatus (e.g., including fixed-functionality hardware logic, configurable logic, logic instructions, or any combination thereof), operating system driver and/or system firmware (e.g., basic input/output system/BIOS) that implements one or more aspects of the method 20 (FIG. 2) and/or the method 30 (FIG. 3), already discussed. In the illustrated example, a performance monitor 44a is configured to monitor one or more runtime performance characteristics of a link. A degradation detector 44b may be coupled to the performance monitor 44a, wherein the illustrated degradation detector 44b determines a state of the link based on at least one of the one or more runtime performance characteristics. Additionally, a training scheduler 44c coupled to the degradation detector 44b may automatically schedule a retraining of the link based on the state of the link.

In one example, the training scheduler 44c includes a parameter optimizer 46 (46a, 46b) to set one or more retraining parameters. Thus, the parameter optimizer 46 might include a margin component 46a to configure at least one of the one or more retraining parameters to increase an operational margin of the link if the state satisfies a degradation condition. Alternatively, the margin component 46a might configure at least one of the one or more retraining parameters to allow a decrease to an operational margin if the state does not satisfy a degradation condition. In such a case, a power component 46b may initiate one or more power lowering operations with respect to the link if the state does not satisfy the degradation condition.

Figure 5:
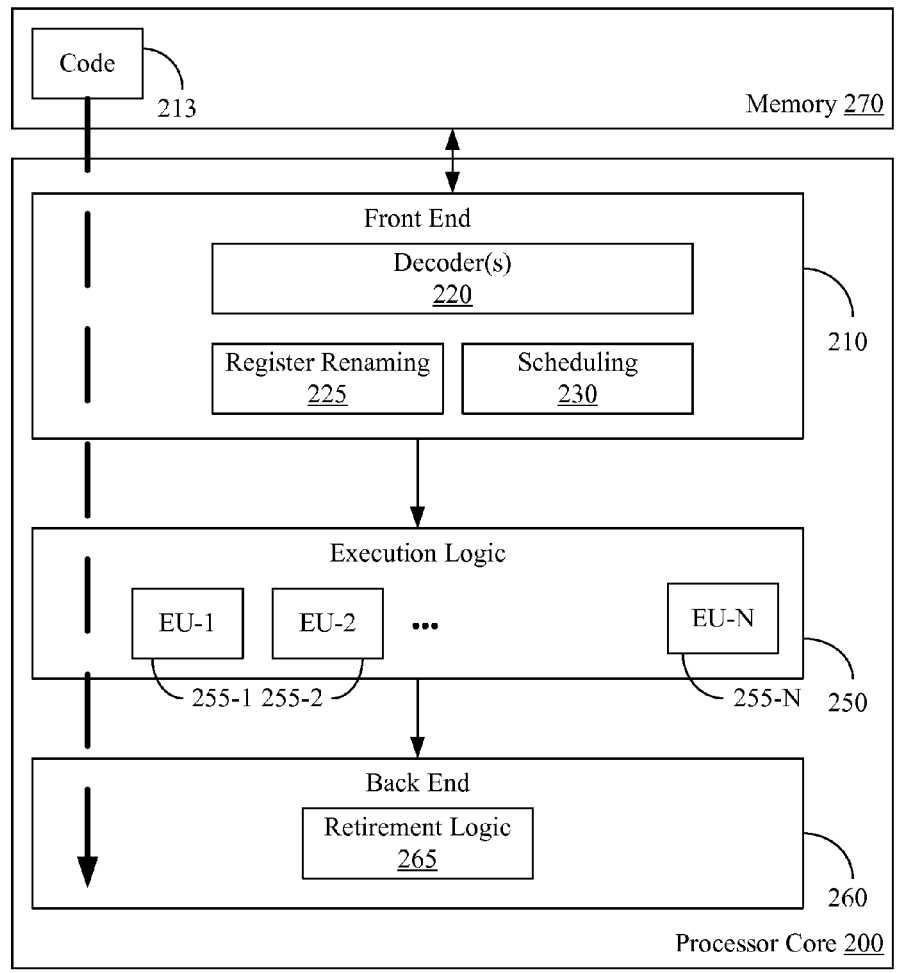
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the link manager 44 (FIG. 4), the method 20 (FIG. 2) and/or the method 30 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 6, shown is a block diagram of a computing system 1000 (e.g., server, blade, desktop computer, notebook computer, tablet computer, convertible tablet, smart phone, mobile Internet device/MID, wearable computer, media player, etc.) embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the link manager 44 (FIG. 4), the method 20 (FIG. 2) and/or the method 30 (FIG. 3), already discussed, and may be similar to the code 213 (FIG. 5), already discussed. Thus, the code 1030 may be used to automatically schedule the retraining of any of the interconnects and/or communication busses shown in FIG. 6. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples:

Example 1 may include a system to conduct link-based operations, comprising a host processor, a subsystem, a link coupled to host processor and the subsystem, and a link manager coupled to one or more of the host processor, the subsystem or the link. The link manager may include a performance monitor to monitor one or more runtime performance characteristics of the link, a degradation detector coupled to the performance monitor, the degradation detector to determine a state of the link based on at least one of the one or more runtime performance characteristics, and a training scheduler coupled to the degradation detector, the training scheduler to automatically schedule a retraining of the link based on the state of the link.

Example 2 may include the system of Example 1, wherein the training scheduler includes a parameter optimizer to set one or more retraining parameters.

Example 3 may include the system of Example 2, wherein the parameter optimizer includes a margin component to configure at least one of the one or more retraining parameters to increase an operational margin of the link if the state satisfies a degradation condition.

Example 4 may include the system of Example 2, wherein the parameter optimizer includes a margin component to configure at least one of the one or more retraining parameters to allow decreases to an operational margin of the link if the state does not satisfy a degradation condition, and a power component to initiate one or more power lowering operations with respect to the link if the state does not satisfy the degradation condition.

Example 5 may include the system of any one of Examples 1 to 4, wherein the one or more runtime performance characteristics are to include one or more of an error status, a bandwidth status, a retransmission status, a power consumption status or a thermal status.

Example 6 may include the system of any one of Examples 1 to 4, wherein the link includes one or more of a memory bus, a processor-to-processor bus or an input/output bus.

Example 7 may include a method of managing a link, comprising monitoring one or more runtime performance characteristics of the link, determining a state of the link based on at least one of the one or more runtime performance characteristics, and automatically scheduling a retraining of the link based on the state of the link.

Example 8 may include the method of Example 7, wherein scheduling the retraining of the link further includes setting one or more retraining parameters.

Example 9 may include the method of Example 8, wherein setting the one or more retraining parameters includes configuring at least one of the one or more retraining parameters to increase an operational margin of the link if the state satisfies a degradation condition.

Example 10 may include the method of Example 8, wherein setting the one or more retraining parameters includes configuring at least one of the one or more retraining parameters to allow decreases to an operational margin of the link if the state does not satisfy a degradation condition, and initiating one or more power lowering operations with respect to the link if the state does not satisfy the degradation condition.

Example 11 may include the method of any one of Examples 7 to 10, wherein the one or more runtime performance characteristics include one or more of an error status, a bandwidth status, a retransmission status, a power consumption status or a thermal status.

Example 12 may include the method of any one of Examples 7 to 10, wherein one or more of a memory bus, a processor-to-processor bus or an input/output bus is scheduled for retraining.

Example 13 may include at least one computer readable storage medium comprising a set of instructions which, when executed by a computing system, cause the computing system to monitor one or more runtime performance characteristics of a link, determine a state of the link based on at least one of the one or more runtime performance characteristics, and automatically schedule a retraining of the link based on the state of the link.

Example 14 may include the at least one computer readable storage medium of Example 13, wherein the instructions, when executed, cause a computing system to set one or more retraining parameters.

Example 15 may include the at least one computer readable storage medium of Example 14, wherein the instructions, when executed, cause a computing device to configure at least one of the one or more retraining parameters to increase an operational margin of the link if the state satisfies a degradation condition.

Example 16 may include the at least one computer readable storage medium of Example 14, wherein the instructions, when executed, cause a computing device to configure at least one of the one or more retraining parameters to allow decreases to an operational margin of the link if the state does not satisfy a degradation condition, and initiate one or more power lowering operations with respect to the link if the state does not satisfy the degradation condition.

Example 17 may include the at least one computer readable storage medium of any one of Examples 13 to 16, wherein the one or more runtime performance characteristics are to include one or more of an error status, a bandwidth status, a retransmission status, a power consumption status or a thermal status.

Example 18 may include the at least one computer readable storage medium of any one of Examples 13 to 16, wherein one or more of a memory bus, a processor-to-processor bus or an input/output bus is to be scheduled for retraining.

Example 19 may include an apparatus to manage a link, comprising a performance monitor to monitor one or more runtime performance characteristics of the link, a degradation detector coupled to the performance monitor, the degradation detector to determine a state of the link based on at least one of the one or more runtime performance characteristics, and a training scheduler coupled to the degradation detector, the training scheduler to automatically schedule a retraining of the link based on the state of the link.

Example 20 may include the apparatus of Example 19, wherein the training scheduler includes a parameter optimizer to set one or more retraining parameters.

Example 21 may include the apparatus of Example 20, wherein the parameter optimizer includes a margin component to configure at least one of the one or more retraining parameters to increase an operational margin of the link if the state satisfies a degradation condition.

Example 22 may include the apparatus of Example 20, wherein the parameter optimizer includes a margin component to configure at least one of the one or more retraining parameters to allow decreases to an operational margin of the link if the state does not satisfy a degradation condition, and a power component to initiate one or more power lowering operations with respect to the link if the state does not satisfy the degradation condition.

Example 23 may include the apparatus of any one of Examples 19 to 22, wherein the one or more runtime performance characteristics are to include one or more of an error status, a bandwidth status, a retransmission status, a power consumption status or a thermal status.

Example 24 may include the apparatus of any one of Examples 19 to 22, wherein one or more of a memory bus, a processor-to-processor bus or an input/output bus is to be scheduled for retraining.

Example 25 may include an apparatus to manage a link, comprising means for performing the method of any of Examples 7 to 12.

Thus, techniques described herein may detect anomalous events on a link and/or degradation of a link, and trigger a retraining of that link at the next opportunity. The link may take into account the event(s) that triggered the retraining to better optimize the parameters and/or retraining approach.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system to conduct link-based operations, comprising:
    a host processor;
    a subsystem;
    a link coupled to the host processor and the subsystem; and
    a link manager coupled to one or more of the host processor, the subsystem or the link, the link manager including:
        a performance monitor to monitor one or more runtime performance characteristics of the link,
        a degradation detector coupled to the performance monitor, the degradation detector to determine a state of the link based on at least one of the one or more runtime performance characteristics, and
        a training scheduler coupled to the degradation detector, the training scheduler to automatically schedule a retraining of the link based on the state of the link, wherein the training scheduler enables the link to be selectively retrained throughout the life of the link to automatically adapt to component degradation and other operational considerations over time in order to maintain an target performance profile.

2. The system of claim 1, wherein the training scheduler includes a parameter optimizer to set one or more retraining parameters.

3. The system of claim 2, wherein the parameter optimizer includes a margin component to configure at least one of the one or more retraining parameters to increase an operational margin of the link if the state satisfies a degradation condition.

4. The system of claim 2, wherein the parameter optimizer includes:
a margin component to configure at least one of the one or more retraining parameters to allow decreases to an operational margin of the link if the state does not satisfy a degradation condition; and
a power component to initiate one or more power lowering operations with respect to the link if the state does not satisfy the degradation condition.

5. The system of claim 1, wherein the one or more runtime performance characteristics are to include one or more of an error status, a bandwidth status, a retransmission status, a power consumption status or a thermal status.

6. The system of claim 1, wherein the link includes one or more of a memory bus, a processor-to-processor bus or an input/output bus.

7. A method of managing a link, comprising:
monitoring one or more runtime performance characteristics of the link;
determining a state of the link based on at least one of the one or more runtime performance characteristics; and
automatically scheduling a retraining of the link based on the state of the link, wherein the retraining of the link includes selectively retraining the link throughout the life of the link to automatically adapt to component degradation and other operational considerations over time in order to maintain an target performance profile.

8. The method of claim 7, wherein scheduling the retraining of the link further includes setting one or more retraining parameters.

9. The method of claim 8, wherein setting the one or more retraining parameters includes configuring at least one of the one or more retraining parameters to increase an operational margin of the link if the state satisfies a degradation condition.

10. The method of claim 8, wherein setting the one or more retraining parameters includes:
configuring at least one of the one or more retraining parameters to allow decreases to an operational margin of the link if the state does not satisfy a degradation condition; and
initiating one or more power lowering operations with respect to the link if the state does not satisfy the degradation condition.

11. The method of claim 7, wherein the one or more runtime performance characteristics include one or more of an error status, a bandwidth status, a retransmission status, a power consumption status or a thermal status.

12. The method of claim 7, wherein one or more of a memory bus, a processor-to-processor bus or an input/output bus is scheduled for retraining.

13. At least one non-transitory computer readable storage medium comprising a set of instructions which, when executed by a computing system, cause the computing system to:

monitor one or more runtime performance characteristics of a link;
determine a state of the link based on at least one of the one or more runtime performance characteristics; and
automatically schedule a retraining of the link based on the state of the link, wherein the retraining of the link includes selectively retraining the link throughout the life of the link to automatically adapt to component degradation and other operational considerations over time in order to maintain an target performance profile.

14. The at least one non-transitory computer readable storage medium of claim 13, wherein the instructions, when executed, cause a computing system to set one or more retraining parameters.

15. The at least one non-transitory computer readable storage medium of claim 14, wherein the instructions, when executed, cause a computing device to configure at least one of the one or more retraining parameters to increase an operational margin of the link if the state satisfies a degradation condition.

16. The at least one non-transitory computer readable storage medium of claim 14, wherein the instructions, when executed, cause a computing device to:
configure at least one of the one or more retraining parameters to allow decreases to an operational margin of the link if the state does not satisfy a degradation condition; and
initiate one or more power lowering operations with respect to the link if the state does not satisfy the degradation condition.

17. The at least one non-transitory computer readable storage medium of claim 13, wherein the one or more runtime performance characteristics are to include one or more of an error status, a bandwidth status, a retransmission status, a power consumption status or a thermal status.

18. The at least one non-transitory computer readable storage medium of claim 13, wherein one or more of a memory bus, a processor-to-processor bus or an input/output bus is to be scheduled for retraining.

19. An apparatus to manage a link, comprising:
a performance monitor to monitor one or more runtime performance characteristics of the link;
a degradation detector coupled to the performance monitor, the degradation detector to determine a state of the link based on at least one of the one or more runtime performance characteristics; and
a training scheduler coupled to the degradation detector, the training scheduler to automatically schedule a retraining of the link based on the state of the link, wherein the training scheduler enables the link to be selectively retrained throughout the life of the link to automatically adapt to component degradation and other operational considerations over time in order to maintain an target performance profile.

20. The apparatus of claim 19, wherein the training scheduler includes a parameter optimizer to set one or more retraining parameters.

21. The apparatus of claim 20, wherein the parameter optimizer includes a margin component to configure at least one of the one or more retraining parameters to increase an operational margin of the link if the state satisfies a degradation condition.

22. The apparatus of claim 20, wherein the parameter optimizer includes:
a margin component to configure at least one of the one or more retraining parameters to allow decreases to an operational margin of the link if the state does not satisfy a degradation condition; and a power component to initiate one or more power lowering operations with respect to the link if the state does not satisfy the degradation condition.

23. The apparatus of claim 19, wherein the one or more runtime performance characteristics are to include one or more of an error status, a bandwidth status, a retransmission status, a power consumption status or a thermal status.

24. The apparatus of claim 19, wherein one or more of a memory bus, a processor-to-processor bus or an input/output bus is to be scheduled for retraining.

* * * * *